United States Patent
Shih et al.

[11] Patent Number: 5,546,486
[45] Date of Patent: Aug. 13, 1996

[54] OPTICAL FIBER END FOR APPLICATION IN AN OPTICAL ISOLATOR AND A METHOD OF MANUFACTURE THEREOF

[75] Inventors: Ming Shih, Milpitas; Jingyu Xu; Weng-Herng Su, both of San Jose; Jing-Jong Pan, Milpitas, all of Calif.

[73] Assignee: E-Tek Dynamics, Inc., San Jose, Calif.

[21] Appl. No.: 205,919

[22] Filed: Mar. 3, 1994

[51] Int. Cl.[6] .................................................. G02B 6/25
[52] U.S. Cl. .................... 385/31; 385/33; 385/123; 216/24
[58] Field of Search ............... 385/31, 33, 123–133, 385/49; 216/24

[56] References Cited

U.S. PATENT DOCUMENTS

| | | | |
|---|---|---|---|
| 3,883,353 | 5/1975 | Cohen et al. | 385/99 |
| 4,581,528 | 4/1986 | Brogardh et al. | 385/31 X |
| 4,747,660 | 5/1988 | Nishioka et al. | 385/31 |
| 4,812,005 | 3/1989 | Heywang | 385/31 X |
| 5,073,002 | 12/1991 | Hockaday | 385/49 |
| 5,208,876 | 5/1993 | Pan | 385/11 |

*Primary Examiner*—John D. Lee
*Assistant Examiner*—Phan T. H. Palmer
*Attorney, Agent, or Firm*—Townsend and Townsend and Crew LLP

[57] ABSTRACT

An optical fiber having an improved input fiber end for an optical isolator. The end of the fiber has a flat end surface substantially perpendicular to the longitudinal axis of the fiber. An optical barrier layer, formed by a layer of chromium and a layer of gold, covers the end surface of the fiber with an aperture exposing the core and covering the cladding of the fiber. Light transmission into the end is substantially reduced to increase the reflection loss of the optical isolator.

22 Claims, 4 Drawing Sheets

OPTICAL FIBER END FOR APPLICATION IN AN OPTICAL ISOLATOR AND A METHOD OF MANUFACTURE THEREOF

BACKGROUND OF THE INVENTION

The present invention is related to optical fibers and, more particularly, to techniques for reducing reflection back into input optical fibers. Such techniques find applications in many fields, including optical devices such as isolators.

In present day optical fiber technology, semiconductor lasers are typically used to generate and relay light signals on optical fibers. These lasers are particularly susceptible to light signal reflections, which cause a laser to become unstable and noisy. Optical isolators are used to block these reflected signals from reaching the laser. Ideally, these optical isolators transmit all of the light signals in the forward direction and block all of the signals in the reverse direction. Thus an optical isolator's isolation, which is a measure of the amount of light lost travelling from an output fiber to an input fiber of the optical isolator, is much larger than its insertion loss, which is a measure of light lost travelling in the forward direction.

The present invention allows at least one type of optical isolator to raise its reflection loss near the ideal, i.e., that no light at all from the output fiber is transmitted back into the input fiber.

The central elements of this type of optical isolator are illustrated in FIG. 1A. The isolator has two birefringent crystal polarizers 10A and 10B, between which is placed a Faraday rotator 11. The rotator 11 is formed typically from doped garnet or YIG, and is placed in a permanent magnet 12. On one side of these central elements is placed the input optical fiber and on the other side is placed the output optical fiber. A collimating element, such as an ordinary lens or a graded index lens, is placed between each optical fiber and the central elements. (The optical fibers and collimating elements are not shown in this drawing.)

In the forward direction, collimated light from the input fiber is directed toward the slanted front face of the polarizer 10A. Each of the birefringent polarizers 10A and 10B have two indexes of refraction, one for the light polarized perpendicularly to the optical axis and another for the light polarized parallel to the optical axis of the birefringent polarizer 10A. The light, represented by a ray 14 in FIG. 1A, is split into two rays, an ordinary ray 14B polarized perpendicularly to the crystal's optical axis and an extraordinary ray 14A polarized parallel to the optical axis, in accordance with the polarization modes of the incoming light. The light from the polarizer 10A is rotated by the Faraday rotator by 45°. Due to the orientation of the optical axis of the second polarizer 10B, the two rays 14A and 14B leave the second polarizer 10B in parallel and in a direction so that the second collimating element combines and refocuses the light into the core of the output fiber.

A slightly different operation occurs when light is sent back in the reverse direction, as illustrated in FIG. 1B. The light from the output fiber and second collimating element represented by a ray 15 is split into two rays 15A and 15B by the second polarizer 10B and rotated by the Faraday rotator 11. This rotation is nonreciprocal with the rotation of light in the forward direction, however, so that the ordinary ray 15B from the second polarizer 10B is polarized perpendicularly with the optical axis of the first polarizer 10A and the extraordinary ray 15A from the second polarizer 10B is polarized with the optical axis of the first polarizer 10A. The ordinary and extraordinary rays from the second polarizer 10B have swapped places incident upon the first polarizer 10A. Because of this exchange, the light, having passed through the first polarizer 10A, leaves the polarizer 10A in directions which are not parallel. The non-parallel light from the polarizer 10A is focused by the collimating element before the input fiber at points which are not located at the end of the input fiber. More precisely stated, the light is not focussed on the core of the input fiber and is theoretically not transmitted back into the fiber. A more detailed description of this type of optical isolator may be found in U.S. Pat. No. 5,208,876, entitled, "OPTICAL ISOLATOR," which issued May 4, 1993 to J. J. Pan.

Nonetheless, while the described optical isolator operates admirably with high reflecting losses, there is still room for improvement. The present invention achieves this improved performance so that an optical isolator can be built with low transmission loss and very high reflection loss.

SUMMARY OF THE INVENTION

The present invention provides for an improved end of an optical fiber, which has a core and a cladding around the core parallel to a longitudinal axis of the fiber. The fiber end comprises a flat end surface substantially perpendicular to the longitudinal axis, the end surface intersecting the core and cladding; and an optical barrier layer on the end surface. The optical barrier layer, formed by a chromium layer and a gold layer, has an aperture exposing the core and covering the cladding. Light transmission into the end is substantially reduced.

The present invention also provides for method of manufacturing an optical fiber having a core and a cladding around the core parallel to a longitudinal axis of the fiber. The method comprises forming a flat surface at the end of the fiber, the surface substantially perpendicular to the longitudinal axis; forming a reflecting layer over the end surface; and forming an aperture through the reflecting layer to expose the core. Light transmission into the fiber end is substantially reduced.

DETAILED DESCRIPTION OF THE PREFERRED EMBODIMENTS

Figure 1A:
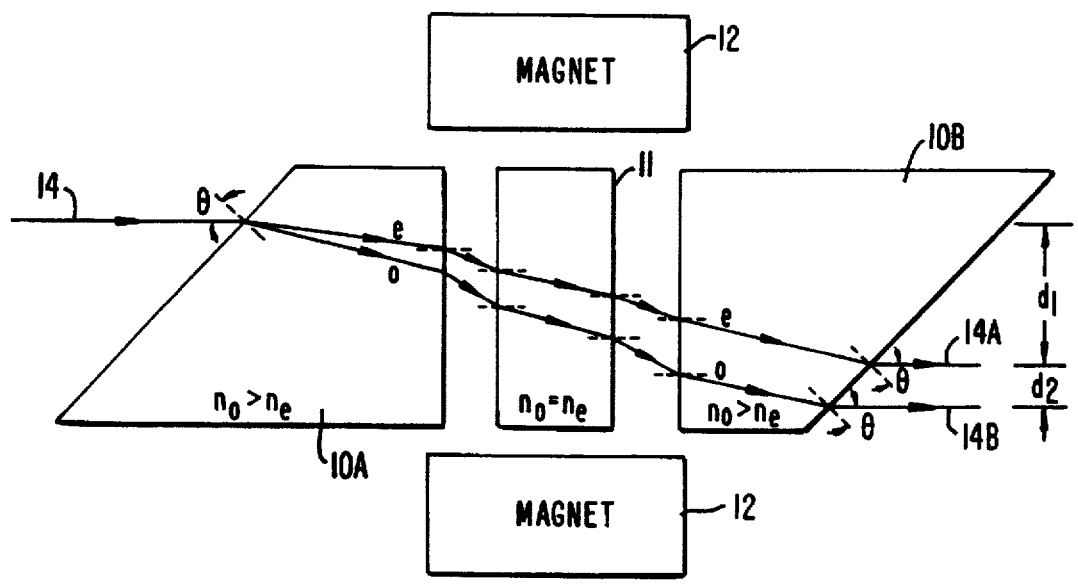
FIG. 1A is a representative diagram of light rays travelling in the forward direction through the central portion of a present day optical isolator.
Figure 1B:
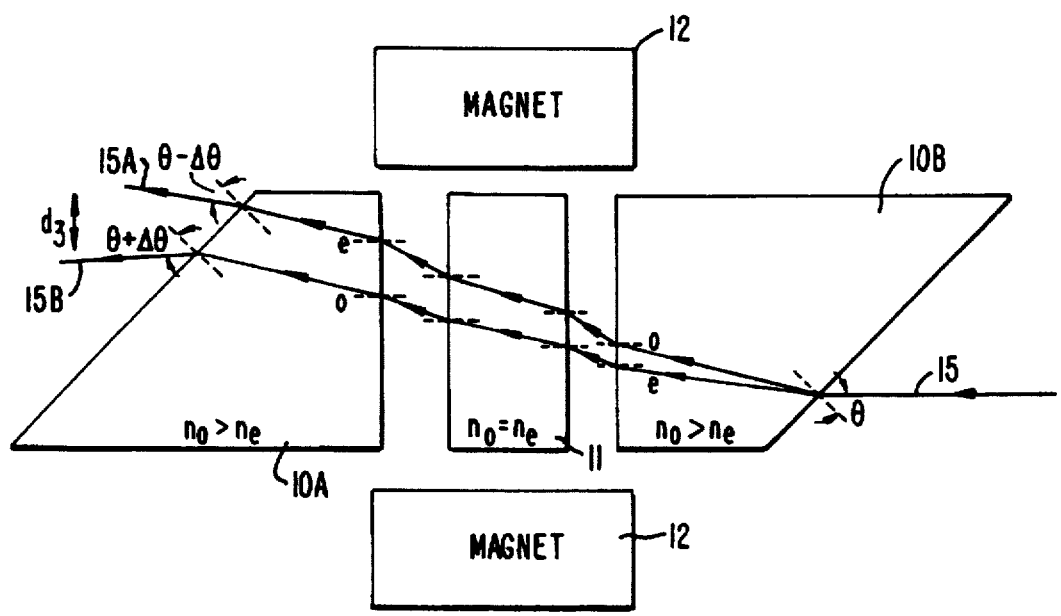
FIG. 1B is a representative diagram of light rays travelling in the reverse direction through the central portion of the optical isolator in FIG. 1A.
Figure 2:
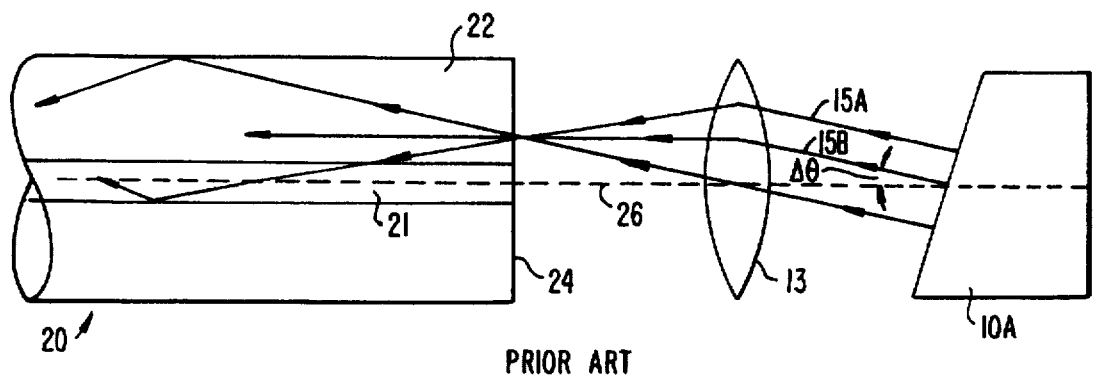
FIG. 2 is a detailed view of the end of the input optical fiber in the optical isolator of FIG. 1B with respect to the light rays in the reverse direction.

A more thorough understanding of the present invention may be achieved by a closer examination of the operation of the previously described optical isolator in the reverse direction. As illustrated in FIG. 2, the rays 15A and 15B leave the first polarizer 10A in nonparallel rays toward a collimating element, here shown as an ordinary lens 13. From the direction of the rays 15A and 15B, the light is focussed by the lens 13 on a location on the end surface 24 of an input fiber 20. Specifically, the location is the cladding 22 and not the central core 21, the region in which light is transmitted in an optical fiber. Thus light transmission from the output fiber into the input fiber is effectively blocked.

Figure 3A:
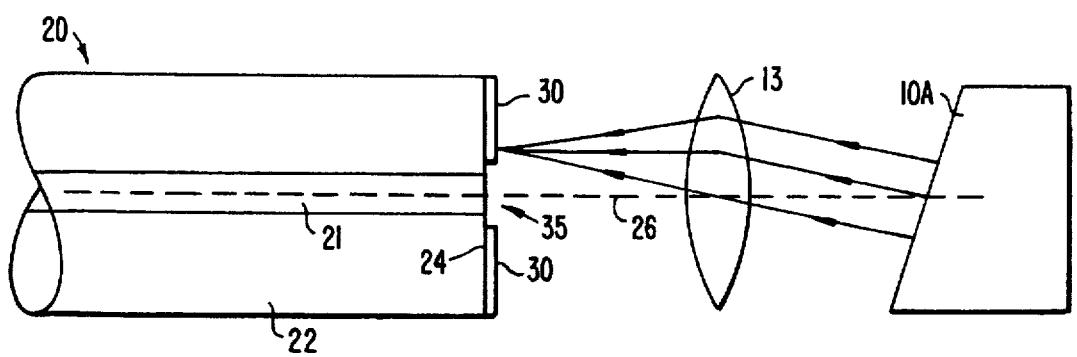
FIG. 3A is a detailed view of the end of the input optical fiber according to the present invention in an optical isolator similar to the one illustrated in FIGS. 1A and 1B with respect to the light rays in the reverse direction.
Figure 3B:
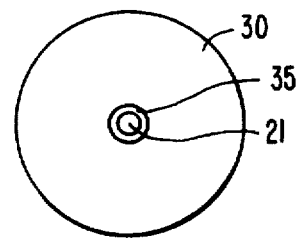
FIG. 3B illustrates an end view of the input optical fiber of FIG. 3A.

Nonetheless, the present invention recognizes that there is some coupling between the cladding and core of an optical fiber. Some of the light which has entered the cladding 22 of the input fiber 20 will leak back into the core 21. To prevent any light from entering the cladding 22, the present invention places an optical barrier 30 over the cladding 22 of the end surface 24 of the input fiber 20 as shown in FIGS. 3A and 3B. The barrier 30 has an opening 35 which exposes the core 21 of the end surface 24, as shown in an end view of the fiber end in FIG. 3B. The opening 35 also exposes some portion of the cladding 22 around the core 21 to allows light to be transmitted from the core 21 in the forward direction with some allowance of deviation from the longitudinal axis 26 of input fiber 20. Thus the end of the fiber 20 has a mask over the cladding 22 and the core 21 is exposed.

FIG. 4A–4G illustrate a process for manufacturing the end of the input optical fiber according to one embodiment of the present invention.

Figure 4A:
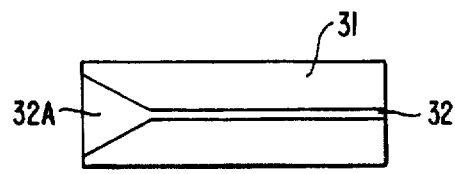
FIGS. 4A–4G illustrate process steps in manufacturing the optical fiber with the end shown in FIGS. 3A and 3B according to one embodiment of the present invention.
Figure 4B:
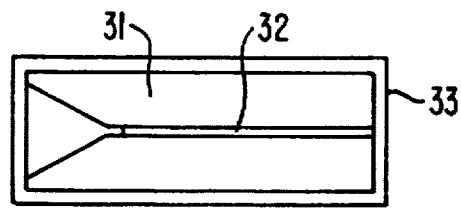

FIG. 4A illustrates a glass cylinder into which the end of the input fiber is to be mounted. The glass cylinder 31 has a central channel 32 having a diameter sufficient to accommodate the core 21 and cladding 22 of the input fiber 20. The channel 32 opens into a wide mouth portion 32A at one end of the cylinder 31. As shown in FIG. 4B, the cylinder 31 is coated with an optical barrier 33 formed by a layer of chromium, having a thickness greater than 500Å, over which is coated a layer of gold having a thickness greater than 1000Å. The chromium and gold layers may be deposited on the cylinder 31 by metal sputtering processes, which are well known in the semiconductor industry.

Figure 4C:
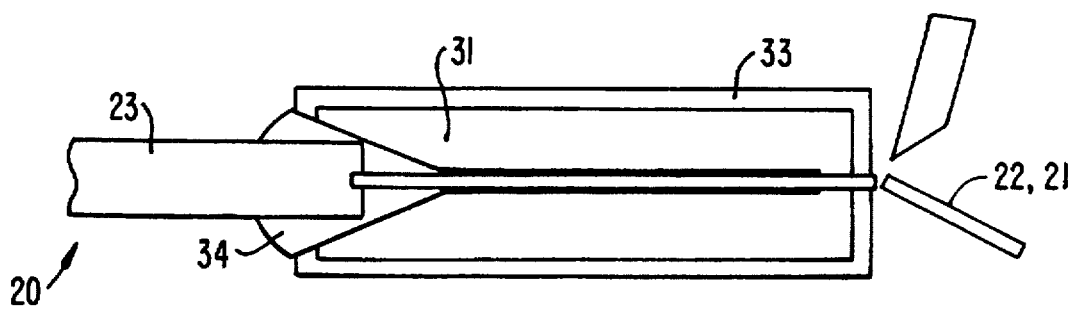

At the end of the input fiber 20, a protective jacket 23 of the fiber 20 is removed to expose the cladding 22 which surrounds the core 21 (not shown). The core 21 and cladding 22 are inserted into the channel 32 of the glass cylinder 31 from the wide mouth portion 32A, and set in place by a heat-cured epoxy, such as epoxy 353ND from Epoxy Technology, Inc. of Bellerica, Mass. As shown in FIG. 4C, there is a 1 to 2 millimeter gap from the opposite end of the cylinder 31 which has no epoxy. The assembly is baked to set the epoxy, and the cladding 22 and core 21 of the input fiber 20 which extends beyond the cylinder 31 is trimmed away.

Figure 4D:
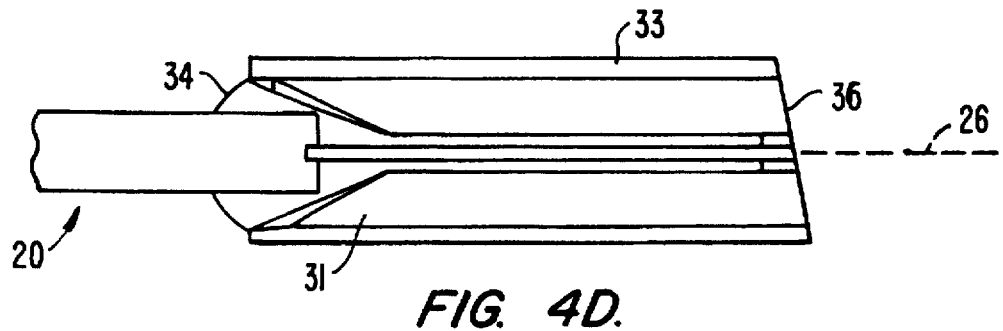

Then, as shown in FIG. 4D, the end of the cylinder 31 and input fiber 20 is polished at an angle, approximately 10° from the perpendicular to the longitudinal axis 26 of the cylinder 31 and input fiber 20. The cylinder 31 has a resulting angled surface 36 with a corresponding coplanar end surface 24 of the input fiber 20.

Figure 4E:
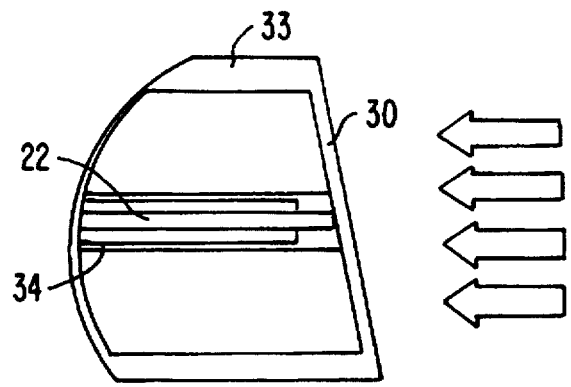

Chromium is sputtered onto the surfaces 36 and 24 of the cylinder 31 to a thickness of 300Å to 500Å, as shown in FIG. 4E. The chromium layer is followed by a sputtering of gold to a thickness from 1000Å to 2000Å to form the optical barrier 30. It should be noted that the optical barrier 30 is formed from chromium and gold layers because of the properties of each metal. Chromium adheres very well to glass, the material of the fiber 21 and the cylinder 31. Titanium also serves this purpose. Gold, being highly reflective, blocks light transmission effectively. Platinum, silver and aluminum are also good reflective metals.

Besides metal layers, dielectric coatings of silicon dioxide and magnesium oxide may also be used for the barrier 30. Multiple layers of these coatings further decrease the wavelength selectivity of the optical barrier 30 so that effectiveness of the barrier 30 is increased and the performance of the optical isolator is further enhanced.

Figure 4F:
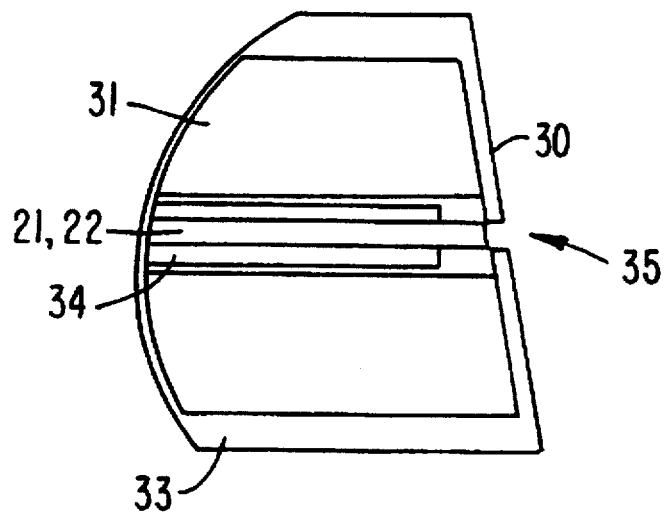
Figure 4G:
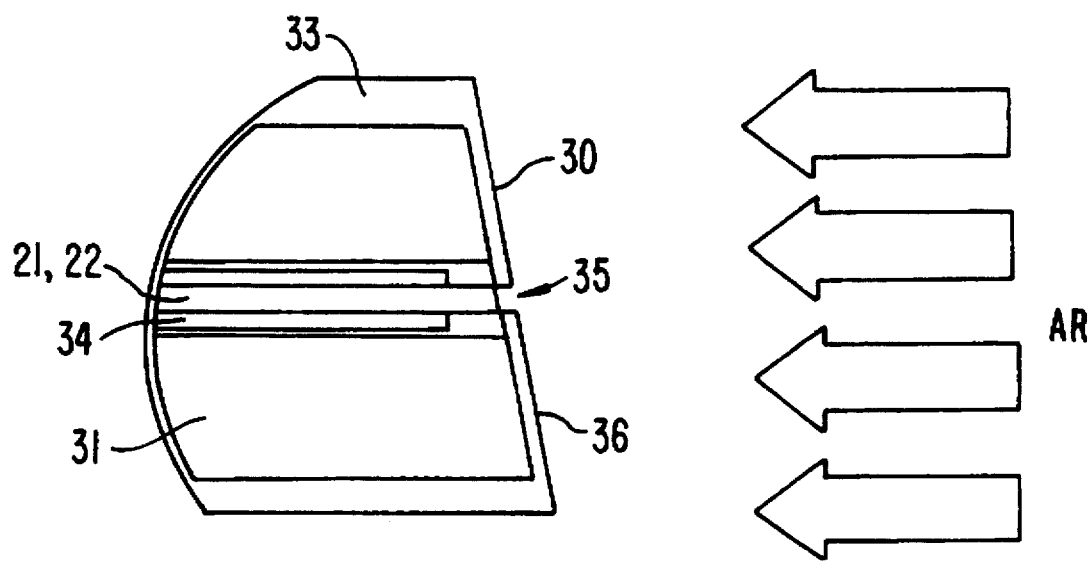

To remove the layers forming the optical barrier 30 over the core 21 and the portions with cladding 22 around the core 21, a photoresist layer is deposited to a thickness of 1000Å to 2000Å by carefully placing a droplet of photoresist over the barrier 30 formed by the chromium and gold layers in this embodiment of the present invention. The photoresist layer over the core 21 is exposed by directing light from the input fiber 20 through the chromium and gold layers. The photoresist layer is then developed and the portion over the core 21 is removed. With standard etching techniques well known in the semiconductor industry, a wet etching operation is performed to remove the gold and chromium layers of the barrier 30. Moreover, over-etching is performed on the gold and chromium layers so that portions of these layers over the cladding 22 and around the core 21 are also removed. For example, if the diameter of the core of the input fiber 20 is 10 microns, then over-etching of the metal layers to a diameter of 20 microns for the aperture 35 is suitable. The over-etching of the metal layers around the core 21 avoids increasing the insertion loss. The result of this operation is shown in FIG. 4F.

The operation above was described for positive photoresist. Alternatively, if negative photoresist is used, the photoresist layer is deposited over the fiber end surface 24 before the deposition of the metal layers. The photoresist layer over the core 21 is exposed by directing light from the input fiber 20 and the photoresist layer is developed. Only the portion of the photoresist layer over the core 21 remains. Then the chromium and gold layer for the optical barrier 30 are deposited and a "lift-off" technique, well-known in semiconductor processing, is used to remove the photoresist, chromium and gold layers over the core 21.

Finally, the surface of the optical barrier 30 and the end surface 34 of the input fiber 20 in the opening 35 are covered with antireflection coatings, such as layers of $TiO_2$ and $SiO_2$. Other antireflection coatings include $ZrO_2$ and $SiO_2$, and a combination of $TiO_2+ZrO_2$ and $SiO_2$. These antireflection coatings and the techniques for applying them have long been practiced in the optics field. The antireflection coatings enhance the transmission of light in the forward direction through the input fiber 20. For the optical isolator, the insertion loss is decreased, as desired.

Thus, with this embodiment of the present invention, an improvement of the reflection loss in the described optical isolator by 5 dB has been observed. The reflection loss has been found to reach values up to 99.99 percent.

The present invention has been described in the context of optical isolators. However, there are many other applications for the present invention. For example, the present invention reduces the generation and reception of evanescent modes of input and output light signals and may be used effectively in fiber optic sensors, image transmission, medical fiber optic endoscopy. Constant optical power transmission may be achieved through short haul fibers with minimal cladding mode fluctuation. Furthermore, the present invention can improve the following: the output uniformity of 1×N optical couplers; the coupling uniformity between a single-mode optical fiber and optical elements, such as a collimator, diffraction grating or a GRIN lens (making the GRIN lens operate as a quasi-point source); the performance of an optical fiber grating and related elements using the fiber grating, such as a filter and stabilized laser; the performance of high frequency photodetectors (small active areas) and the reduction of back reflection; the stability of fiber-coupled surface-emitting laser diodes; and the extinction ratio of fiber pigtailed Integrated Optic Circuit (IOC) devices by the reduction of surface mode generation and reception.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. In an optical fiber having a core and a cladding around said core parallel to a longitudinal axis of said fiber, said fiber having an end, said fiber end comprising a flat end surface, said end surface intersecting said core and cladding and forming an angle of approximately 10° from the perpendicular to said longitudinal axis; and an optical barrier layer on said end surface, said optical barrier layer, having an aperture so that said core is exposed and said cladding is covered;

whereby light transmission into said end is substantially reduced.

2. The optical fiber of claim 1 wherein said optical barrier layer comprises metal.

3. The optical fiber of claim 2 wherein said optical barrier layer comprises a first layer of metal on said end surface, wherein said first layer adheres to said end surface, and a second layer of metal on said first layer of metal, wherein said second layer blocks light transmission.

4. The optical fiber of claim 3 wherein said first layer of metal comprises a metal from the group consisting of chromium and titanium.

5. The optical fiber of claim 3 wherein said first later of metal comprises a metal from the group consisting of gold, platinum, silver and aluminum.

6. The optical fiber of claim 1 wherein said optical barrier layer comprises dielectric material.

7. The optical fiber of claim 6 wherein said optical barrier layer comprises silicon dioxide.

8. The optical fiber of claim 6 wherein said optical barrier layer comprises magnesium oxide.

9. The optical fiber of claim 6 wherein said optical barrier layer comprises multiple layers of dielectric material.

10. The optical fiber of claim 1 wherein said aperture exposes part of said cladding around said core whereby light transmission from said fiber end is maximized.

11. A method of manufacturing an optical fiber having a core and a cladding around said core parallel to a longitudinal axis of said fiber, said fiber having an end, said method comprising forming a flat end surface at said fiber end, said surface substantially perpendicular to said longitudinal axis;

forming an optical barrier layer over said flat end surface;

depositing a layer of photoresist over said optical barrier layer;

defining a portion of said photoresist layer over said core by exposing said portion to light through said core; and removing said defined portion of said photoresist layer to expose a portion of said optical barrier layer; and etching said exposed portion of said optical barrier layer with said photoresist layer as a mask;

whereby light transmission into said end is substantially reduced.

12. The method of claim 11 wherein said optical barrier layer forming step comprises depositing at least: one dielectric layer onto said flat end surface.

13. The method of claim 12 wherein said optical barrier layer forming step comprises depositing a layer of silicon dioxide onto said flat end surface.

14. The method of claim 12 wherein said optical barrier layer forming step comprises depositing a layer of magnesium oxide onto said flat end surface.

15. The method of claim 11 wherein said optical barrier layer forming step comprises depositing a metal layer onto said flat end surface.

16. The method of claim 15 wherein said optical barrier layer forming step comprises depositing a first layer of metal from the group consisting of chromium and titanium on said flat end surface and depositing a second layer of metal from the group consisting of gold, platinum, silver and aluminum on said first layer of metal.

17. The method of claim 11 wherein said flat surface forming step comprises fixing said optical fiber into a holder having an end;

cutting said optical fiber so that said end of said optical fiber is substantially coplanar with said end of said holder; and polishing said ends of said optical fiber and said holder so that said flat surface of said optical fiber is coplanar with said end of said holder.

18. The method of claim 17 wherein said polishing step comprises polishing said end of said optical fiber such that said flat surface is at an angle of approximately 10' from the perpendicular to said longitudinal axis.

19. A method of manufacturing an optical fiber having a core and a cladding around said core parallel to a longitudinal axis of said fiber, said fiber having an end, said method comprising:

forming a flat end surface at said fiber end, said surface substantially at an angle of approximately 10° from the perpendicular to said longitudinal axis;

forming an optical barrier layer over said end surface;

forming an aperture through said optical barrier layer to expose said core; and whereby light transmission into said end is substantially reduced.

20. The method of claim 19 wherein said aperture forming step further comprises:

depositing a layer of photoresist over said end surface of said fiber;

defining a portion of said photoresist layer over said core by exposing said portion to light through said core;

removing said photoresist layer except for said defined portion over said core;

forming said barrier layer over said end surface and said defined portion; and lifting off said defined portion and said barrier layer over said defined portion to expose said core.

21. The method of claim 19 wherein said optical barrier layer forming step comprises depositing a first layer of metal from the group consisting of chromium and titanium on said flat end surface and depositing a second layer of metal from the group consisting of gold, platinum, silver and aluminum on said first layer of metal.

22. The method of claim 19 wherein said optical barrier layer forming step comprises depositing at least one dielectric layer onto said flat end surface.

* * * * *